(12) United States Patent
Alexeev et al.

(10) Patent No.: US 6,925,234 B2
(45) Date of Patent: Aug. 2, 2005

(54) FLEXURE APPARATUS AND METHOD FOR ACHIEVING EFFICIENT OPTICAL COUPLING

(75) Inventors: Nikolai Alexeev, Longmont, CO (US); Bernard P. Masterson, Louisville, CO (US)

(73) Assignee: Melles Griot, Inc., Carlsbad, CA (US)

( * ) Notice: Subject to any disclaimer, the term of this patent is extended or adjusted under 35 U.S.C. 154(b) by 144 days.

(21) Appl. No.: 10/317,662

(22) Filed: Dec. 12, 2002

(65) Prior Publication Data

US 2004/0114873 A1 Jun. 17, 2004

(51) Int. Cl.[7] ............................................... G02B 6/00
(52) U.S. Cl. ........................................ 385/52; 385/90
(58) Field of Search .............................. 385/15, 31, 33, 385/39, 50–52, 88, 92, 93

(56) References Cited

U.S. PATENT DOCUMENTS

| 4,753,510 | A | | 6/1988 | Sezerman | |
|---|---|---|---|---|---|
| 4,889,406 | A | | 12/1989 | Sezerman | |
| 5,195,155 | A | * | 3/1993 | Shimaoka et al. | 385/90 |
| 5,351,330 | A | * | 9/1994 | Jongewaard | 385/93 |
| 5,668,899 | A | * | 9/1997 | Jadrich | 385/33 |
| 6,276,843 | B1 | | 8/2001 | Alcock et al. | |
| 6,585,427 | B2 | * | 7/2003 | Finot et al. | 385/92 |
| 6,789,955 | B2 | * | 9/2004 | Anderson | 385/88 |

* cited by examiner

Primary Examiner—Frank G. Font
Assistant Examiner—Christopher M. Kalivoda
(74) Attorney, Agent, or Firm—Law Offices of James D. McFarland (57) ABSTRACT

An inexpensive, robust, and adhesive-free method and apparatus is disclosed for efficiently coupling first and second optical components together utilizing a flexure assembly for fine alignment. An initial three-dimensional rough alignment process positions the first and second optical components proximate to each other and aligns them in three dimensions. The first and second components are then misaligned by a fixed amount, causing a defocus, and then securely fastened together. The fine alignment process uses standard machine screws, or other easily attainable, robust tensioning means to progressively increase the tension around the periphery of the flexure assembly, which causes the flexure to bend and the second optical component to translate along the longitudinal axis of the flexure assembly and tilt with respect to the longitudinal axis of the flexure assembly, which re-focuses and three-dimensionally finely aligns the optical components for optimum coupling efficiency in a simple and secure manner.

55 Claims, 7 Drawing Sheets

FLEXURE APPARATUS AND METHOD FOR ACHIEVING EFFICIENT OPTICAL COUPLING

BACKGROUND OF THE INVENTION

1. Field of the Invention

The present invention generally relates to a device and method of coupling elements that require precision alignment, and more particularly to a method of coupling optical components that require fine alignment to achieve efficient optical coupling.

2. Description of Related Art

The coupling of laser light into optical fiber is a critical technology for telecommunications, metrology and a wide variety of other applications. Efficient optical coupling typically requires diffraction-limited focusing of light from a source (usually a laser or LED) into the core of an optical fiber. Since the core of a typical optical fiber is less than 10 microns in diameter, the tightly focused light must be directed to the fiber core with great precision and this precise alignment must be maintained over extended periods (e.g. years) despite changes in temperature and humidity, mechanical vibrations and other hazardous conditions. The alignment becomes increasingly more critical if the single mode fibers have an extremely small diameter (e.g. about 3.0 microns) such as those used with shorter wavelength lasers (e.g. GaN-based lasers).

Using conventional assembly techniques, mechanical tolerance stack-up in commercial diode laser packages, standard machined parts and standard commercial optics amounts to about 1 mm$^3$ of uncertainty. If, for example, a fiber coupling lens is mounted in front of a diode laser in a standard CD-ROM package then the position of the focus of light from the diode laser may be anywhere within a volume of about 1 mm on a side. Since a typical optical fiber for visible light has a core of just 4 microns in diameter, it is evident that a precision, sub-micron alignment is required within this much larger (approximately 1 mm$^3$) volume. An analogous problem arises when attempting to couple light from a collimated laser such as a gas, ion or diode-pumped solid state (DPSS) laser.

The conflicting requirements of alignment range and tolerance have led to two basic classes of approaches. The first approach is to start with bare laser die and, using alignment techniques such as silicon optical bench methods, position the laser emission aperture and lensed fiber to the required tolerances, and fix the elements in place through laser welding or precision soldering. The second approach is to use an adhesive to fix components in place after the precision alignment step is finished.

The first approach requires a semiconductor-processing infrastructure (clean-room environment, manipulation under microscope, and ability to handle bare semiconductor die) and greatly restricts the versatility of the process for two reasons. First, this approach can only be economical for very large quantities and second, since only bare die compatible with the manufacturing process can be handled, there is no way to take advantage of the great variety of diode lasers of different wavelengths and powers now available in industry-standard, TO-18 CD-ROM packages. In addition, it is typical for misalignment to occur during the welding process due to uneven thermal expansion; this misalignment, know as post-welding shift, must be corrected by a subsequent re-bending step. Other techniques are subject to similar misalignment problems due to the fastening process.

The second approach (which uses an adhesive) depends wholly on the choice of adhesive, and the requirements on the adhesive are severe. This adhesive must be a low-viscosity liquid during the precision alignment so it does not interfere with the alignment. Furthermore, the adhesive must be chosen to cure rapidly after application but without shrinkage or excessive outgassing, which causes misalignment. It must not undergo chemical reactions or outgas upon exposure to laser light and it must maintain mechanical stability and adhesion for many years over a wide range of temperatures and humidity. Proprietary adhesives have been used to meet some of these requirements, but the perfect adhesive does not exist. Moreover, the introduction of adhesive compounds into an opto-mechanical system represents a long-term reliability risk.

As described above, these fiber-coupling methods align the optical elements and then fasten them together. Because the fastening occurs after alignment, the fastening process causes some misalignment that must be corrected after the alignment process has been completed. For example, mechanical shifting occurs after a weld due to the rapid heating and cooling of the metals being attached. As another example, slippage typically occurs when bolting two objects together. Unless a subsequent fine alignment process is available, this shifting or slippage will remain. Such fine alignment, especially in three dimensions, has been difficult to accomplish in practice. For example, the subsequent re-bending discussed with the first approach above is difficult and unpredictable.

In devising suitable aligning mechanisms and procedures, a complicating factor is that alignment must be achieved in three dimensions. There are many mechanisms for two-dimensional positioning, but adjusting the position along a third axis without losing alignment along the other two axes is very difficult. This problem is often attacked by breaking up the optical alignment process into a pre-focusing or pre-collimating step to fix one degree of freedom, followed by a final two-dimensional alignment step. This type of two-step approach can be effective, but increases process time and cost.

U.S. Pat. No. 5,351,330 to Jongewaard describes a fiber-coupled laser assembly in which lateral alignment is accomplished by moving the coupling optics, which are mounted on a flexure. The flexure allows fine positioning in two dimensions only. In addition, focusing must take place in a separate step after which the ferrule is set in place by a set screw, which prevents further fine adjustment.

U.S. Pat. No. 6,276,843 to Alcock et al. teaches the use of a kinematic positioner that allows a pre-collimated fiber/lens assembly to be positioned in front of a collimated laser beam. This positioner is adjustable but is bulky and contains many expensive components. Lateral adjustment is accomplished with screws positioned perpendicular to the axis of the barrel; therefore focus adjustment of the lens in front of the fiber (and collimation of the source laser) must be performed in a separate step.

U.S. Pat. Nos. 4,753,510 and 4,889,406 to Sezerman disclose a mechanism for coupling light from a fiber to a fiber or from a light source to a fiber comprising two pre-collimated sections, each containing a fiber or light source and a lens positioned to collimate light emerging from the fiber or light source. In one embodiment, the two sections are separated by a resilient member, such as an O-ring, and fastened together by a set of screws, some in tension and some in compression. Tilting of the two sections can allow lateral alignment, but it is difficult to tighten all of the screws properly without misaligning the mechanism. Without proper tightening of the screws, however, slippage occurs and the alignment degrades. The alignment stability of the completed mechanism is therefore highly dependent on the skill of the assembler. In addition, separate pre-focusing steps are required for both the source and receiver sections. Finally, the resilient member may introduce contamination problems.

In summary, there is a need for a low-cost, reliable, secure and adhesive-free device for coupling optical components. Such a device would preferably possess a large alignment range to accommodate mechanical tolerances in the optical elements and mounting parts, while achieving sub-micron resolution in the finished product. Furthermore, there is a need for a method of achieving efficient coupling that is capable of fine alignment in all three dimensions.

SUMMARY OF THE INVENTION

An optical coupling capable of precision alignment is provided by a base assembly that holds a first optical component such as a light source, to a flexure assembly that holds a second optical component such as an optical fiber. The coupling apparatus is efficient, stable and economical and can be implemented using off-the-shelf mechanical devices with standard tolerances (e.g. standard machine screws) to maintain optical alignment in the face of wide temperature swings and mechanical shock and vibration. This apparatus and method for coupling addresses the conflicting requirements of a large capture range and severe alignment by incorporating a rough alignment step, an intentional misalignment (substantially along the longitudinal axis of the flexure assembly), and a fine alignment step that enables precision three-dimensional alignment after the optical components are securely fastened together.

The first optical component produces light that is focused on a focal point along an optical axis. The second optical component has an optical end point at one end that will be aligned with the focal point. A base assembly holds the first optical component and a flexure assembly holds the second optical component. The flexure assembly includes a flexure that bends when appropriate pressure is applied to the flexure assembly such that the flexure assembly lengthens along the longitudinal axis of the flexure assembly and tilts with respect to the longitudinal axis of the flexure assembly, thereby allowing translation and tilt of the second optical component housed therein, which is used to precision align the optical coupling in three dimensions. Thus, the coupling process positions the focal point to coincide with the optical end point such that efficient coupling of light is achieved between the first and second optical components.

Three basic steps are involved in the efficient optical coupling described herein: a rough alignment step that includes three-dimensional alignment of the optical components; an intentional misalignment substantially along the longitudinal axis of the flexure assembly that causes a defocus; and a fine alignment step that includes additional three-dimensional alignment after the optical components are securely fastened together.

In one embodiment, the rough alignment step begins with general positioning of the base assembly proximate to the flexure assembly without consideration for alignment. A fixed gap is then introduced and held between the base assembly and the flexure assembly while three-dimensional rough alignment is achieved. In one embodiment, the three-dimensional alignment occurs as follows: x-y alignment adjusts the flexure assembly with respect to the base assembly along the x- and y-axes; and z-axis alignment is accomplished by adjusting the second optical component within the flexure assembly. After the rough alignment is finished, the flexure assembly is fastened to the base assembly, thereby eliminating the fixed gap, which defocuses the optical coupling.

In an alternative embodiment, the rough alignment step begins with a general positioning of the base assembly proximate to the flexure assembly such that they are in approximate sliding contact with each other, then the first and second optical components are aligned in three dimensions, as described above. After the rough alignment is completed, the second optical component is moved within the flexure assembly toward the base assembly by a fixed amount such that an intentional offset is created, which defocuses the optical coupling. The second optical component is locked in the offset position and the base and flexure assemblies are fastened together.

In both embodiments, the fine alignment step occurs after the optical coupling is defocused and the components fastened. During the fine alignment step, the flexure assembly is lengthened and tilted, which translates the second optical component along the longitudinal axis and tilts the second optical component about the longitudinal axis, thereby aligning the optical components in three dimensions. The amount of fine alignment is sufficient to compensate for any intentional defocus that occurred as well as additional fine-tuning to correct any mechanical shifting or misalignment that occurred during the fastening process.

Once fine alignment is complete, the focal point produced by the first optical component securely coincides with the optical end point of the second optical component. Furthermore, the coupling is securely held in alignment due to the compressive forces created by the bend in the flexure, which counteract the tension created during fine alignment, thereby creating a securely aligned coupling. Thus, high accuracy and efficiency of light coupling can be achieved using low cost manufacturing techniques, and entirely without the use of adhesives.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the figures, in which like numbers represent the same or similar elements. The overview section, immediately following, will describe the method and device involved in the coupling process. The overview has been provided to establish a general understanding of the elements and steps involved in the coupling. The detailed description, following the overview, will discuss the details of the coupling method and apparatus with particular reference to each of the figures.

Overview

FIGS. 1 through 4 show details of one embodiment of an apparatus involved in efficiently coupling the first and second optical elements. The base assembly and flexure assembly will be described in detail with reference to these figures.

These figures generally show a first optical component disposed within a base assembly. Light from the first optical component is focused to a point along an optical axis. A second optical component is disposed within a flexure assembly and has an optical end point. The flexure assembly is designed to lengthen and tilt with respect to its longitudinal axis to allow fine-tuning of the optical coupling, as will be described. Thus, the coupling process positions the focal point to coincide with the optical end point such that efficient coupling of light is achieved between the first and second optical components.

FIGS. 5 through 10 are cross-sectional views that illustrate the steps involved in coupling two optical components together such that light is efficiently coupled from the first optical component to the second optical component. Three basic steps are involved in the efficient optical coupling: a rough alignment step that enables three-dimensional alignment of the optical components; an intentional misalignment substantially along the z-axis that causes a defocus; and a fine alignment step that enables precision three-dimensional alignment after the optical components are securely fastened together.

Figure 11:
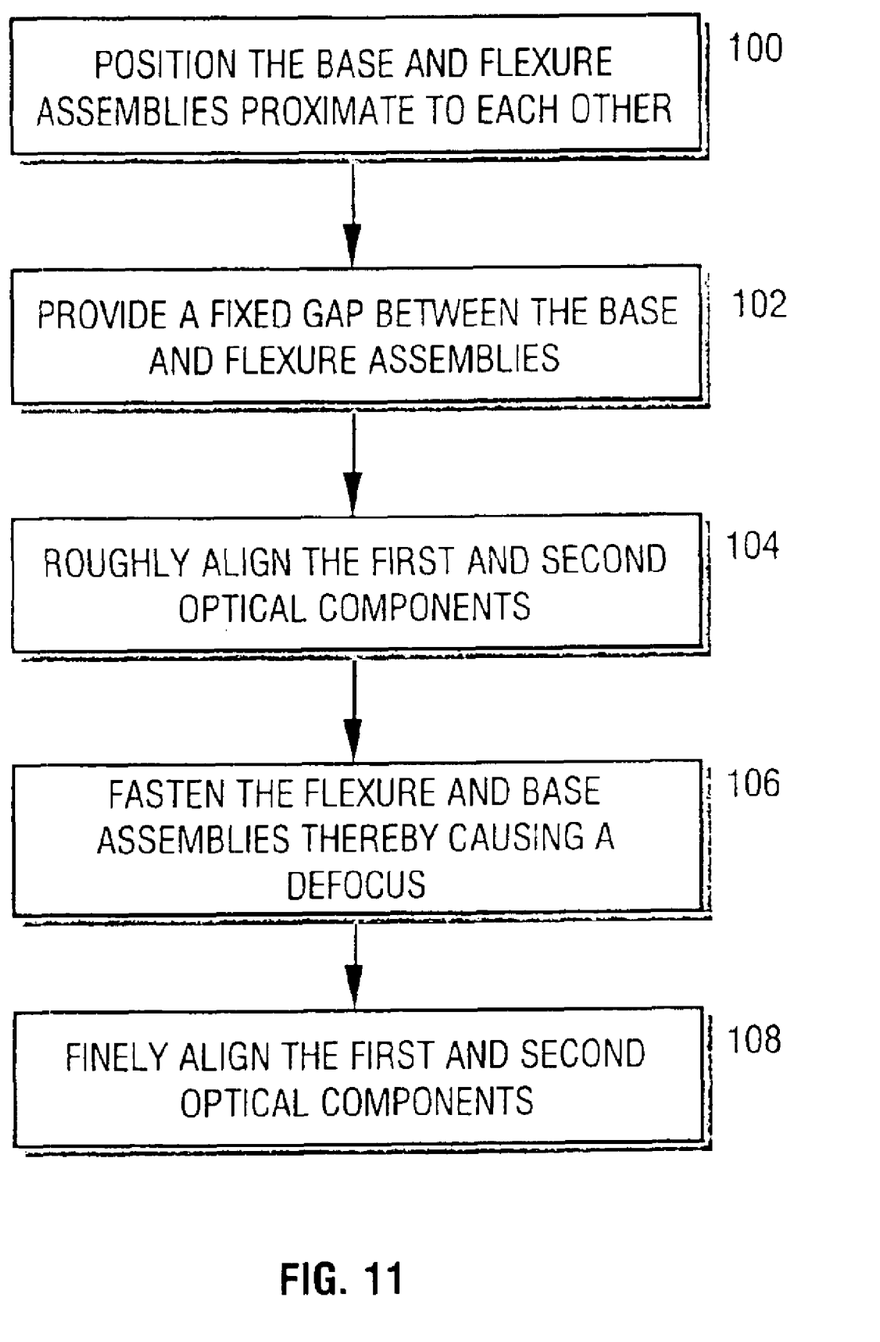
FIG. 11 is a flow chart that describes a method of precisely aligning optical components as described with reference to FIGS. 5 through 10, in which a fixed gap is held between the optical components during rough alignment and misalignment occurs as a result of fastening the optical components.
Figure 12:
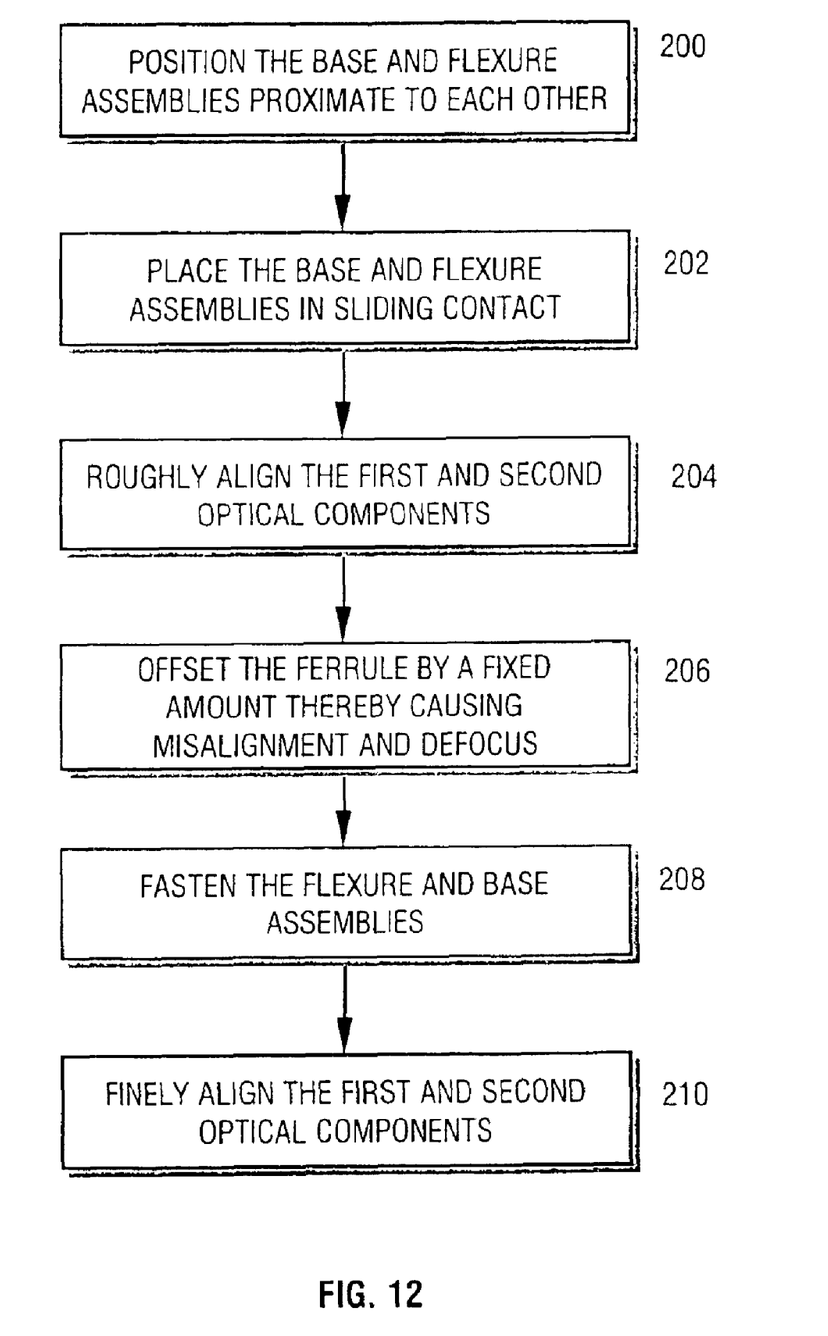
FIG. 12 is a flow chart that describes an alternative method of precisely aligning optical components, in which the optical components are positioned substantially adjacent to each other during rough alignment, and misalignment occurs as a result of translating the second optical component within the flexure assembly.

FIGS. 11 and 12 are flow charts that describe alternative methods of precisely aligning optical components. In one method such as described with reference to FIG. 11, the optical components are roughly aligned with a fixed gap that is later eliminated during the fastening step, thereby defocusing the optical components before fine alignment. In an alternative embodiment such as described with reference to FIG. 12, the optical components are positioned substantially adjacent to each other during rough alignment, and misalignment (thus a defocus) occurs as a result of translating the second optical component within the flexure assembly.

Description

Reference is now made to each of the drawings in greater detail and with greater explanation.

FIGS. 1 through 4 show various views of one embodiment of the coupling device to reveal details of all sides of the device.

In this implementation, an optical coupler 1 is described that includes a base assembly 10, a flexure assembly 30, a plurality of fastening screws 60 for fastening the base and flexure assemblies, and a plurality of alignment screws 62 for finely aligning the coupler. In one embodiment, machine screws are used to fasten and align the base and flexure assembly, however in other embodiments, other known fastening systems could be substituted here, such as clamp(s), bolt(s), welding, or other attachment mechanism.

The base assembly 10 in this embodiment has a generally cylindrical configuration within which a first optical component 12 (shown in FIGS. 5 through 10) is housed. In one embodiment, the first optical component comprises a suitable light source and a lens (or lenses) for focusing the light at a focal point along an optical axis, as will be described with reference to FIGS. 5 through 10.

At the light-emitting end, the base assembly 10 comprises a flat surface 18 for engaging with the flexure assembly 30, as will be described, and a plurality of holes 20 to facilitate fastening the base and flexure assemblies, as described herein. At the other end 22 of the base assembly, an inner surface 24 of the cylinder may be threaded to facilitate attachment of control electronics and drivers (not shown), or any other useful components.

The flexure assembly 30 in this embodiment comprises a generally cylindrical flexure base 32, a generally cylindrical holding block 34 and a generally cylindrical connector tube 36 that connects the flexure base 32 with the holding block 34. A channel 38 (shown in FIG. 3) extends through the entire flexure assembly 30 and is configured to receive the second optical component 40 therein. In this embodiment, the base and flexure assemblies and their associated parts are generally cylindrical in shape, however it should be understood that they could have other geometries.

The second optical component 40 is slidably received within the channel 38 of the flexure assembly 30. In one embodiment, the second optical component 40 comprises an optical fiber 42 held by a ferrule 44, however the second optical component may comprise any suitable light receiving or transmitting element.

The flexure base 32 comprises a flexure 50, a plurality of through-holes 52, an inner surface 54 and an outer surface 56. The flexure 50 extends between the inner circumference 58 of the flexure base and the connector tube 36, and is designed to allow metal deformation for lengthening and tilting of the flexure assembly when tension is applied between the flexure base 32 and holding block 34, as will be described. Although the flexure 50 extends from inner circumference 58 of the flexure base in one embodiment, the flexure could have other configurations within the flexure assembly. It should be further understood that the type and thickness of the material used to construct the flexure could alter the amount of metal deformation and thus the amount of lengthening and tilting of the flexure assembly.

Figure 1:
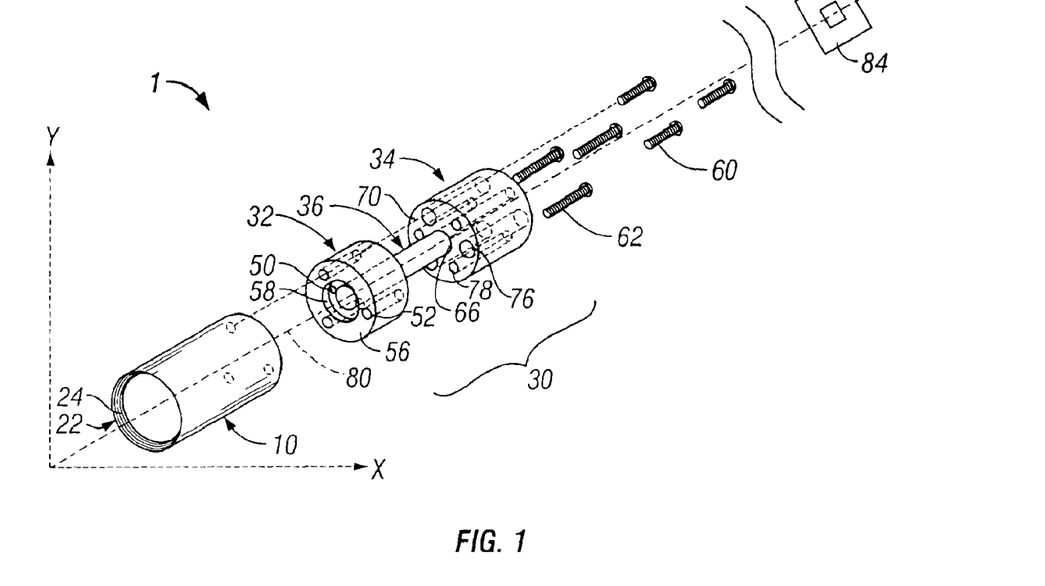
FIG. 1 is a perspective view of one embodiment of the device for coupling a first optical component to a second optical component.
Figure 2:
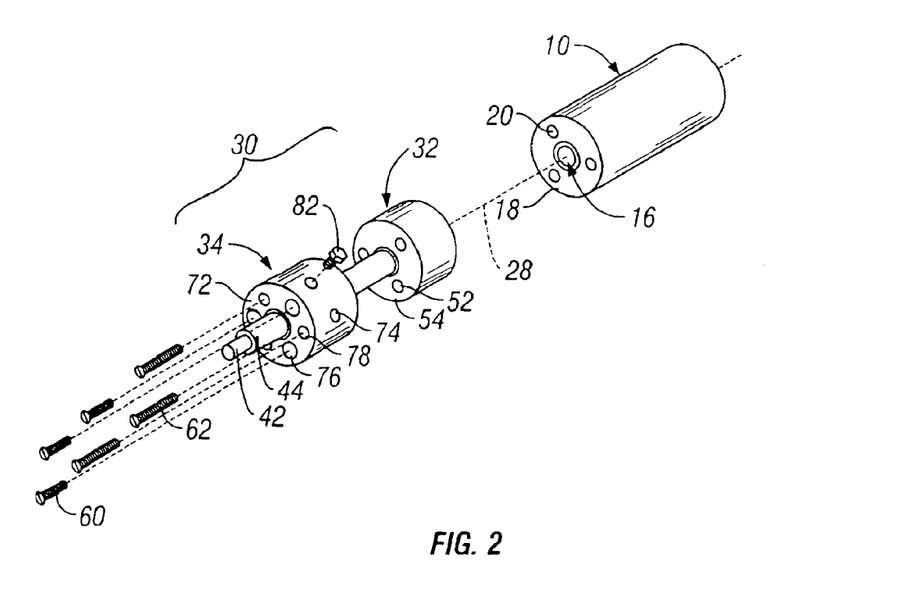
FIG. 2 is a perspective view of the device for coupling a first optical component to a second optical component taken from a perspective opposite that of FIG. 1.

The through-holes 52 extend through the flexure base 32 from the outer surface 56 to the inner surface 54 and are designed to receive the fastening screws 60 (FIGS. 1 and 2). As described elsewhere in more detail, the fastening screws engage with and extend through the through-holes 52 and fasten to the plurality of holes 20 on the outer surface 18 of the base assembly 10, thereby attaching the base and flexure assemblies.

Figure 3:
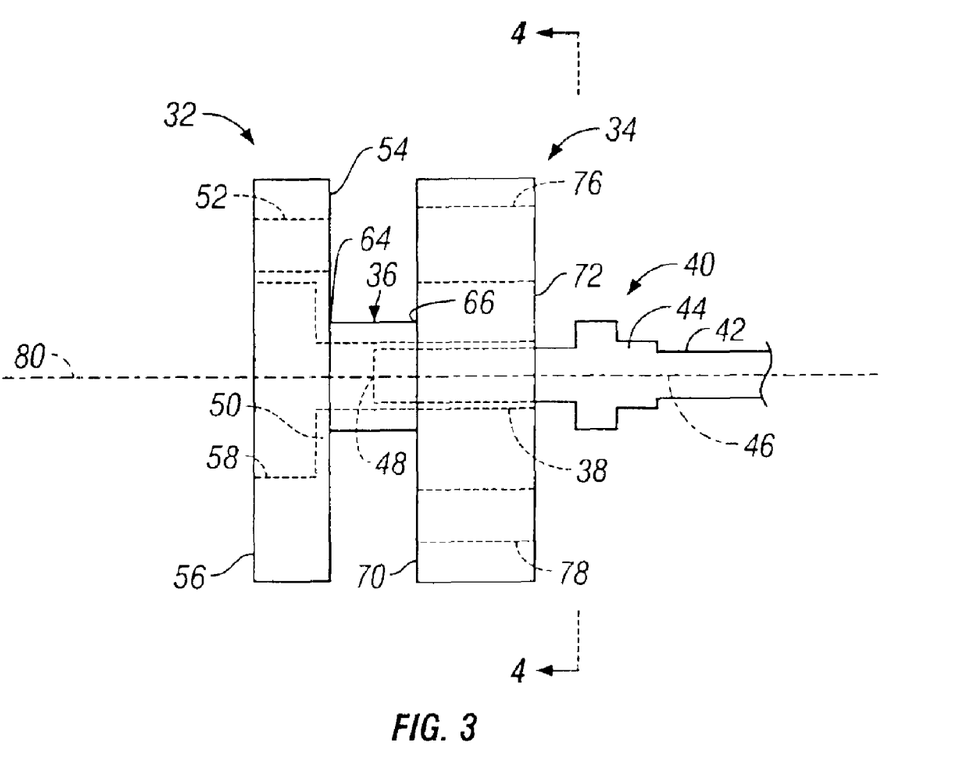
FIG. 3 is a side view of a flexure assembly holding the second optical component.

The connector tube 36 in this embodiment is disposed between the flexure base 32 and the holding block 34. A first end 64 of the connector tube is connected with the flexure 50 on the flexure base 32 and a second end 66 of the connector tube is connected with the holding block 34. The connector tube 36 is sized and configured to connect the flexure base to the holding block with a spacing to allow a plurality of alignment screws 62 to extend from the holding block to the flexure base, as will be described. A channel 38 extends through the entire flexure assembly, including the connector tube as best seen in FIG. 3. Although the connector tube in one embodiment is cylindrical, the connector could be formed with other geometries.

The holding block 34 in this embodiment comprises an inner surface 70, an outer surface 72 that receives the ferrule 44, locking holes 74, a plurality of access-holes 76 and a plurality of alignment holes 78. The ferrule 44 is received within one end of the channel 38 that is located on the outer surface 72 of the holding block. The channel is sized to allow a snug, but slidable fit of the ferrule therein.

The ferrule 44 holds the fiber core 46 that is surrounded by cladding and a cover to form the fiber 42. The optical end point 48 of the fiber 42 is situated on or near the end of the ferrule 44 to allow light to be received therein. Because the ferrule is received within the channel 38, and the channel extends through the entire flexure assembly, light from the light source will be able to travel through the channel and reach the optical end point 48 of the fiber. In this embodiment, the diameter of the optical fiber is less than approximately 10 microns; however a fiber of any size could be used.

Locking holes 74 (shown in FIG. 2) on the outside of the holding block 34 extend radially inward toward the longitudinal axis 80 of the flexure assembly. The locking holes 74 allow for a locking screw 82, or other fastener, to be received therein to lock the ferrule in place within the channel to prevent movement of the ferrule with respect to the flexure assembly.

The access-holes 76 extend through the holding block 34. The fastening screws 60, as described elsewhere in more detail, pass through the access-holes 76 and into through-holes 52 of the flexure base. In this embodiment, there are three fastening screws that pass through three access-holes into three through-holes disposed equidistant around the periphery of the flexure assembly, however, it should be understood that the number and locations of the screws and holes could be altered.

The function of the access-holes 76 is to allow the fasteners 60, which fasten the base assembly to the flexure assembly, to be inserted into the flexure base without the holding block obstructing their path. In other embodiments, the access holes could be configured in other ways, such as cutting-away portions of the holding block, to accomplish this function.

The alignment holes 78 extend through the holding block 34. The alignment holes are configured to receive a plurality of alignment screws 62. In this embodiment, there are three alignment holes disposed equidistant around the periphery of the holding block that receive three alignment screws. However, it should be understood that the number and locations of the screws and holes could be altered, for example, two alignment holes could be configured to receive two alignment screws, in one embodiment.

The size and configuration of the alignment screws 62 and holes 78 are designed such that the alignment screws 62 engage with and extend through the alignment holes 78 and abut the inner surface 54 of the flexure base, such as described in detail with reference to FIG. 8. Thus, once the alignment screws have been fully threaded through their holes and the ends of the screws abut the inner surface of the flexure base, increased tension between the flexure base and holding assembly causes the flexure to bend and the flexure assembly to lengthen and tilt, thereby allowing fine alignment of the second optical component with respect to the first optical component in three dimensions.

In alternative embodiments, the flexure assembly 30 can be designed for greater alignment range or greater resolution. By considering the distance between the optical end point 48 of the fiber and a pivot point about which the flexure assembly tilts, and that distance as a lever arm, the movement that occurs at the optical end point of the fiber for a given turn of the screw may be altered according to the following formula:

$$\frac{dist1}{dist2} = \frac{motion1}{motion2}$$

dist1: distance from fiber optical end point to pivot point
dist2: distance from optical axis to alignment screw
motion1: motion of fiber optical end point
motion2: motion of alignment screw In other words, a large turn of one of the alignment screws can lead to a tiny movement of the optical end point of the fiber, thereby enabling the use of standard coarse machine screws, such as M3 or 2-56, while still achieving sub-micron position resolution.

Figure 4:
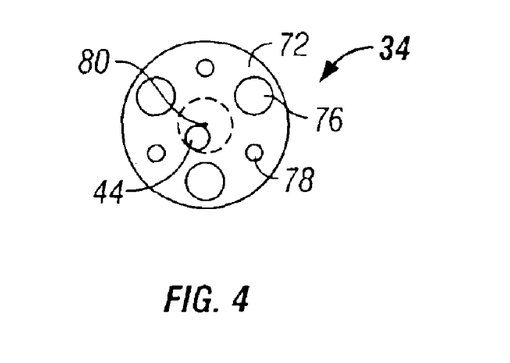
FIG. 4 is an end view taken along line 4—4 of FIG. 3.

FIG. 4 shows an end view of the outer surface 72 of the holding block 34, through which the ferrule 44 may be-slidably received. In one embodiment, the ferrule enters the outer surface of the holding block at a point offset from the longitudinal axis 80 such that the channel and the ferrule within the channel extend towards the longitudinal axis of the flexure assembly an angle. By angling the fiber slightly (e.g. 8 degrees) with respect to longitudinal axis, the focal point from the light source will hit the inner surface of the fiber at an angle directing the reflected light away from the laser rather than back onto it, which can be useful particularly if the light source is susceptible to feedback, such as a laser diode.

Figure 5:
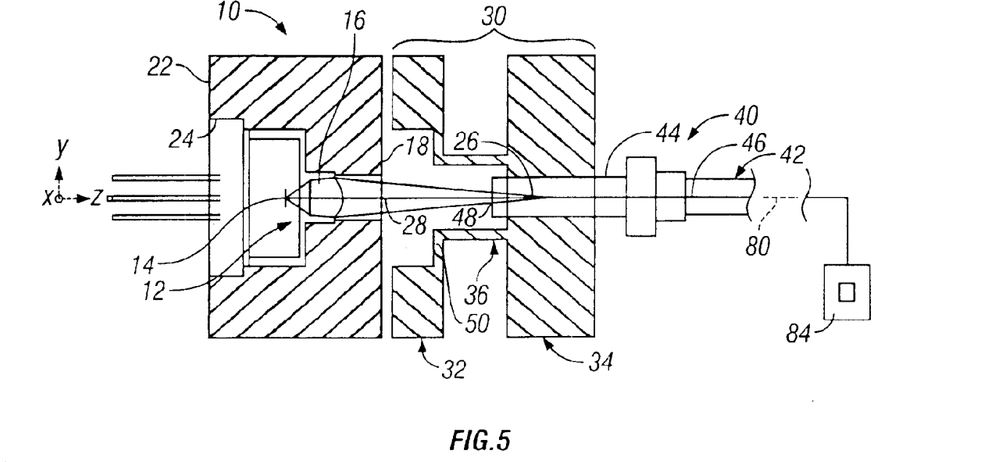
FIG. 5 is a cross-sectional view of one embodiment of base and flexure assemblies that hold first and second optical components, respectively in the first stage of the coupling process before rough alignment.
Figure 6:
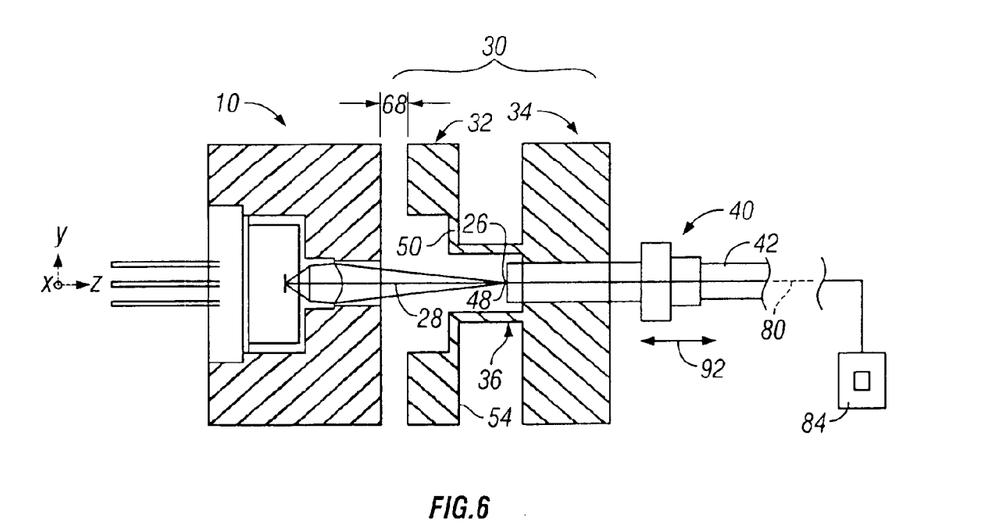
FIG. 6 is a cross-sectional view of the embodiment of FIG. 5 after the rough alignment stage of the coupling process.
Figure 7:
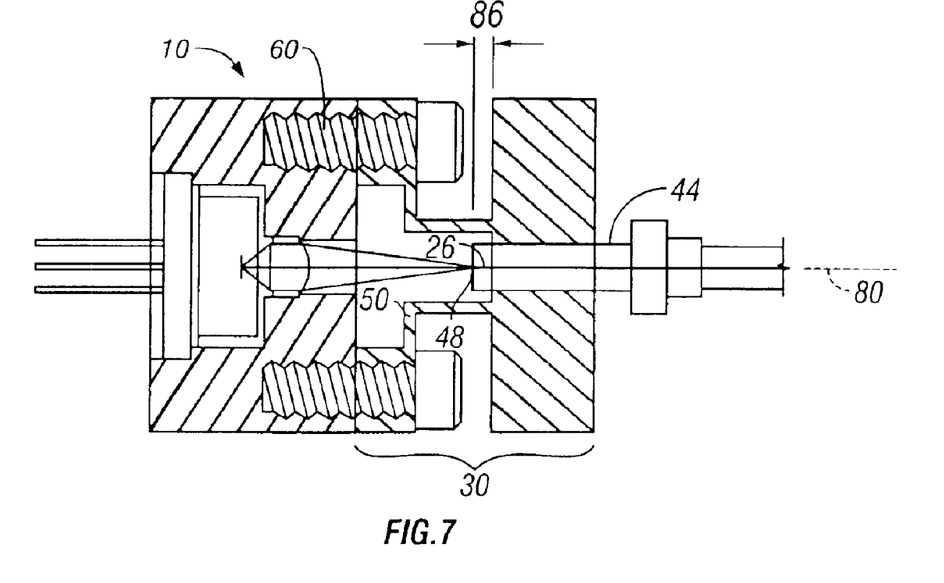
FIG. 7 is a cross-sectional view of the embodiment of FIG. 6 after the fastening stage of the coupling process.
Figure 8:
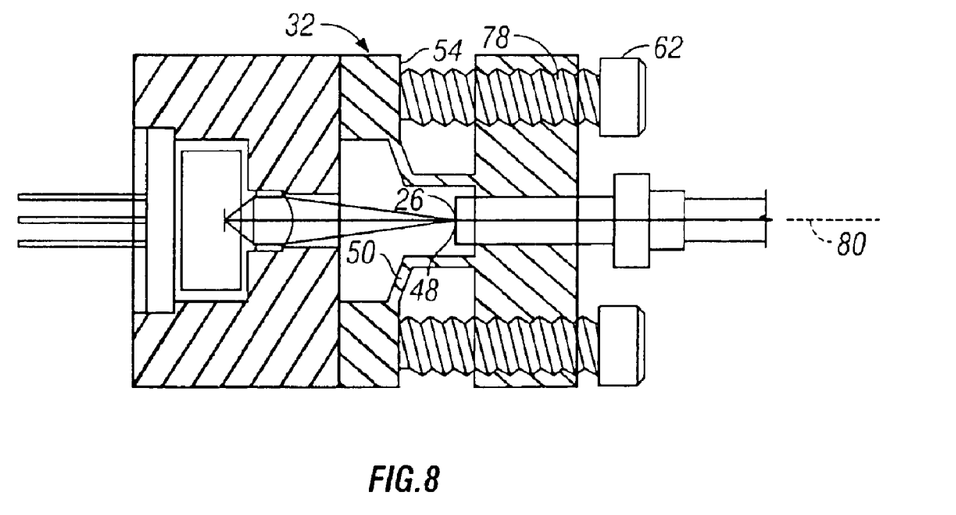
FIG. 8 is a cross-sectional view of the embodiment of FIG. 7 showing the first and second optical components after the fine alignment stage of the coupling process.
Figure 9:
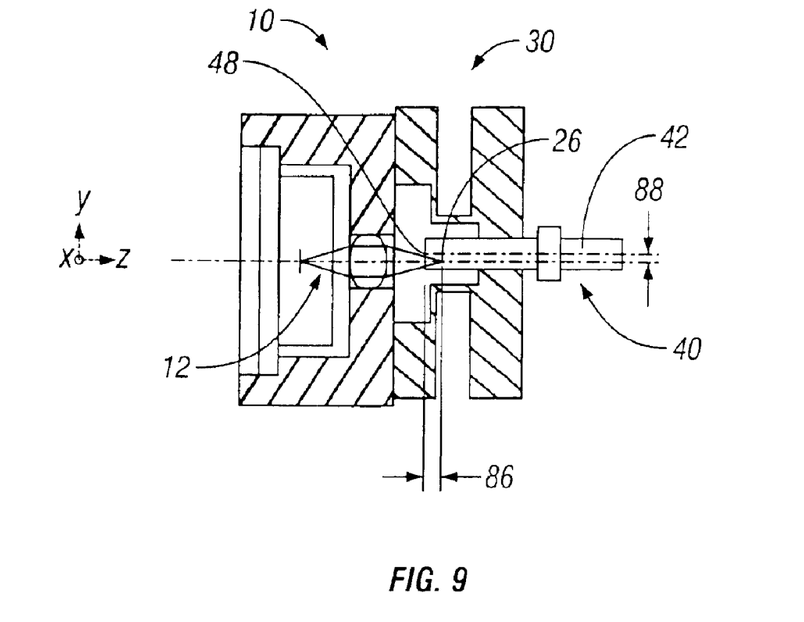
FIG. 9 is a cross-sectional view of an example showing the embodiment of FIG. 7, wherein significant lateral shifting has occurred during the fastening stage of the coupling process.
Figure 10:
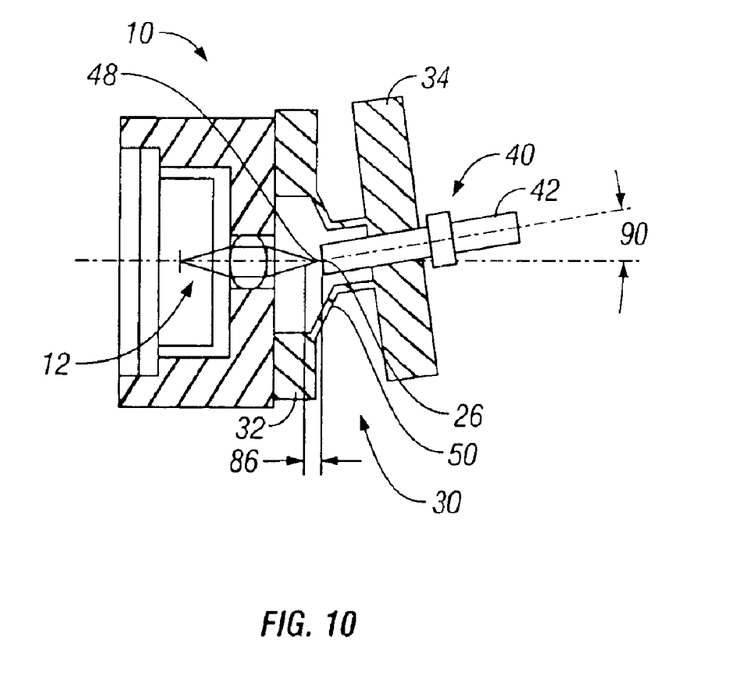
FIG. 10 is a cross-sectional view of the example of FIG. 9 showing the first and second optical components after the fine alignment stage of the coupling process, wherein greater tilting and translation is required to correct the shift that occurred during the fastening process.

Reference is now made to FIGS. 5 through 10, which are cross-sectional views that sequentially illustrate the method of using the coupler to align the first and second optical components. FIGS. 5 and 6 show the rough alignment steps in one embodiment; FIGS. 7 and 8 show the fastening and fine alignment steps in the embodiment of FIGS. 5 and 6; and FIGS. 9 and 10 show one example of the fastening and fine alignment steps of FIGS. 7 and 8 in which greater tilting is required than shown in FIGS. 7 and 8, as will be described with reference to each of the figures, respectively.

FIG. 5 is a cross-sectional view that shows the initial step in the coupling process wherein the base assembly 10 is positioned proximate to the flexure assembly 30. At this stage in the process, almost no light is coupled into the fiber 42 because rough alignment has not yet been achieved. In other words, the focal point 26 produced by the first optical component 12 does not coincide with the optical end point 48 of the fiber 42.

In one embodiment, the first optical component 12 includes a pre-packaged laser diode 14 and a coupling lens 16 that focuses light from the laser. The laser diode has any suitable configuration and composition, for example GaAs, or for shorter wavelengths, GaN. However it should be understood that any light source such as gas, ion, or solid-state lasers, optical fibers with a light output, LEDs, or other known light sources could replace the laser diode as the first optical component within the base assembly 10. The coupling lens 16 can have a variety of configurations, for example, one lens that enables the light source to focus on the focal point 26 or two lenses that work together to collimate and then focus the light source onto the focal point 26.

In another embodiment, the first optical component does not require a coupling lens. For example, by bringing the optical end point of a fiber (second optical component), which may have a microlens built-in, directly adjacent to a semiconductor laser chip (first optical component), successful end coupling can occur without a coupling lens. This end coupling, also known as "butt coupling," will apply the same methods and mechanisms as described herein to accomplish alignment in three dimensions.

Because the base assembly 10 may be assembled without active alignment, it may be constructed at low cost in a manufacturing environment using a variety of conventional manufacturing techniques. Using such manufacturing techniques, the tolerances are relatively large, and there is resulting uncertainty in the laser chip position and the uncertainty of the mounting position of both the laser 14 and lens (or lenses) 16. This uncertainty causes the optical axis 28, and therefore the exact location of the light focus 26, to be undeterminable without further action. However, the rough alignment step followed by the fine alignment as described herein allows these low cost parts to achieve highly efficient optical coupling.

In one embodiment, the second optical component 40 comprises a single-mode optical fiber 42, however it should be understood that any optical fiber or other light receiving means could replace the single mode fiber as the second optical component within the flexure assembly.

FIG. 6 is a cross-sectional view that shows one embodiment of the rough alignment step wherein the flexure assembly 30 is intentionally offset from the base assembly 10, such that a fixed gap 68 (e.g. 50 microns) is introduced between the base assembly and the flexure assembly. The size of the fixed gap will depend on a variety of parameters, such as the flexure material, size of the coupling, and criticality of the coupling accuracy. Thus, although about 50 microns has been suggested for one example, a large range of gap distances may be utilized. For example, a gap within the range of 10–500 microns may be suitable for some embodiments, while other embodiments may require ranges of 20–80 microns or 40–60 microns.

In an alternative method of intentionally offsetting the base and flexure assemblies, such as described elsewhere with reference to FIG. 12, the base and flexure assemblies are brought together substantially into sliding contact, roughly aligned in three dimensions, and then an offset is introduced by sliding the ferrule 44 within the channel 38.

Referring still to FIG. 6, with the fixed gap 68 held in place, the optical end point 48 of the fiber 42 is adjusted in three dimensions with respect to the focal point 26 to achieve maximum coupling efficiency of light. In this embodiment, the x-axis is perpendicular to the longitudinal axis 80 of the flexure assembly 30 and extends out of the page, the y-axis is perpendicular to the longitudinal axis of the flexure assembly and extends vertically up and down the page, and the z-axis follows along the longitudinal axis of the flexure assembly. The optical axis 28 is approximately aligned with the longitudinal axis 80 of the flexure assembly.

The x-y alignment of the optical end point 48 of the fiber 42 with respect to the focal point 26 is accomplished using an x-y positioner such as a nano positioner, however any known method of positioning could be utilized to align the lateral x-y position of the flexure assembly with respect to the base assembly.

Because the ferrule 44 is slidably received within the flexure assembly 30, approximate positioning along the z-axis is accomplished by moving the ferrule within the flexure assembly along the z-axis as shown at 92. This allows translation of the optical end point 48 of the fiber 42 with respect to the focal point 26 of the first optical component 12. In some embodiments, as described with reference to FIG. 4, the ferrule is inserted into the flexure assembly along a line slightly angled from the z-axis. It should be understood that even in this embodiment, translation of the ferrule within the flexure assembly would produce translational alignment, that is, alignment along the z-axis. Although translational movement of an angled ferrule may also create some lateral misalignment, this misalignment can be compensated for during the x-y alignment phase.

The x-, y- and z-alignment is achieved simultaneously and progressively. That is, the x-y lateral alignment and the z-axis translational alignment are iteratively and continuously performed until efficient light coupling is achieved as determined by a technician monitoring the photo detector 84 or other light output measuring device.

Reference is now made to FIGS. 7 and 8, which respectively illustrate one embodiment of the fastening and fine alignment steps. FIG. 7 is a cross-sectional view that shows the next step in the process after the rough alignment step has produced a desired coupling efficiency in three dimensions. The base assembly 10 and flexure assembly 30 are brought together and fastened to each other by any suitable fastening system, such as fastening screws 60. Although machine screws are shown in FIG. 7, any known fastening means such as clamp(s), bolt(s), welding, or other attachment means can be used. Additionally, the ferrule 44 is locked in place within the holding block 34 during this step as has been described.

Because the fastening process eliminates the fixed gap, the first and second optical components become misaligned. Particularly, the focal point 26 of the first optical component 12 becomes offset along the longitudinal axis 80 from the optical end point 48 of the second optical component 40 at the end of the fastening process by the same gap distance, causing a defocus 86 that will be compensated for in the fine alignment step, such as will be described. Additionally, some lateral misalignment is almost inevitable during the fastening, and the fiber is typically displaced from the optimum coupling location by an amount (e.g. 10 microns) that will be corrected in the fine alignment step as will be described.

FIG. 8 is a cross-sectional view that shows the fine alignment step wherein the alignment screws 62 engage with and extend through the alignment holes 78 and abut the inner surface 54 of the flexure base 32. Increasing tension of the alignment screws 62 between the flexure base 32 and holding block 34, by additional tightening of any of the alignment screws, causes the flexure 50 to bend and thus the flexure assembly 30 to lengthen and tilt with respect to its longitudinal axis 80. Lengthening and tilting of the flexure assembly causes the second optical component to translate along the longitudinal axis and tilt about the longitudinal axis such that the focal point 26 of the light source is re-focused onto the optical end point 48 of the fiber. Thus, by monitoring the coupled light output while adjusting the screws, the light output coupling is continually improved until a satisfactory output has been achieved. In FIG. 8, the fastening screws 60 have been removed to better illustrate the alignment screws 62, which also may be standard machine screws. The use of standard machine screws for fine alignment may be sufficient in some embodiments because the fine alignment comes from the structure and function of the flexure assembly; however other screws, such as fine thread screws could replace the standard machine screws if desired.

Three-dimensional fine alignment is achieved simultaneously and progressively. That is, each of the alignment screws are individually tightened (or loosened) progressively around the periphery of the flexure assembly, simultaneous three-dimensional alignment occurs with each adjustment of a screw, and the entire process is continuous and iterative until efficient light coupling is achieved as determined for example by a technician monitoring the photo detector 84 or other light output-measuring device.

In alternative embodiments, three-dimensional fine alignment could be produced by alternative tensioning systems; for example, the flexure or flexure assembly could be reversed from the position shown in the drawings, thus the fine alignment method in such embodiment would include shortening and tilting of the flexure assembly about its longitudinal axis.

As described above, the flexure assembly 30 can be designed for greater alignment range or greater resolution by altering the distance between the optical end point of the fiber 48 and an effective pivot point about which the flexure assembly tilts. Additionally, the selection of material(s) can allow the design of the flexure assembly to be altered for various applications.

In an alternative embodiment, the alignment screws 62 could be configured extend through the flexure assembly in the opposite direction than shown, that is, the alignment screws could extend through holes in the flexure base 32 and thereby abut the inner surface 70 of the holding block 34. Thus, by tightening (or loosening) any of the alignment screws, the flexure assembly 30 could lengthen (or shorten) and tilt with respect to the longitudinal axis 80 of the flexure assembly in a manner similar to that described above with reference to FIG. 8.

After the fine alignment step is complete, the defocus is substantially eliminated and lateral x-y misalignment is reduced to approximately zero, since the second optical component was translated along the longitudinal axis and tilted about the longitudinal axis as the alignment screws were progressively tightened. Thus, fine resolution of the coupling efficiency is achieved through leverage in which a given motion of any of the alignment screws results in a much smaller lateral motion of the optical end point of the fiber. The metal deformation allows very fine position control as the alignment screws work against each other.

The defocus and subsequent refocus (i.e. fine alignment) of the optical coupling, which causes the flexure to bend, creates a compressive force caused by bending in the flexure that works against the tension created by tightening of the alignment screws or other tensioning system. These counteracting forces of tension and compression enable the optical coupling to hold this fine alignment tightly in place. The end result of the coupling process is alignment to the required tolerance in three dimensions with securely tightened screws. The coupling is finished and no curing, adhesives, or other post-processing is required.

Reference is now made to FIGS. 9 and 10, which illustrate one example of the method steps described with reference to FIGS. 7 and 8. FIGS. 9 and 10 further illustrate the defocusing and lateral shifting that could occur when welding, for example, is used to fasten the first and second optical components 12, 40.

FIG. 9 is a cross-sectional view that shows the fastening step in the process after the rough alignment step has produced a desired coupling efficiency in three dimensions. In this example, base and flexure assemblies 10, 30 are fastened together by welding, causing a noticeable lateral shift 88 due to, for example, post-welding shift. In addition to the lateral shift 88 (i.e. along the x- and y-axes), an axial defocus 86 (i.e. along the z-axis) occurs substantially as a result of eliminating the fixed gap (as described with reference to FIG. 7), thereby causing the focal point 26 of the first optical component 12 to be offset from the optical end point 48 of the fiber 42.

It should be noted that a variety of fastening systems (e.g. bolting or clamping) could be substituted for welding. Each different fastening system produces varying degrees of misalignment, and which can be compensated for in the same manner described with reference to FIGS. 8 and 10. It should also be noted that the proportions shown in the drawings (e.g. shift 88 and defocus 86) may be shown slightly exaggerated to better illustrate the alignment process. However, the proportions could be accurate, or even conservative, in some implementations.

FIG. 10 is a cross-sectional view that shows the fine alignment step, and particularly illustrates the tilting and the lengthening of the flexure assembly, thus the translation and tilting of the second optical component that occurs during the fine alignment process to compensate for the significant lateral shift and defocus described with reference to FIG. 9. For illustration purposes, the fine alignment screws are not shown. As described with reference to FIG. 8, the fine alignment step includes simultaneously and progressively increasing tension around the periphery of the flexure assembly by tensioning the alignment screws. Alternatively, any other tensioning system can be used.

At the conclusion of the fine alignment step, the bend in flexure 50 results in axial lengthening of the flexure assembly 30, by an amount 86, thus a translation of the second optical component by the same amount substantially along the longitudinal axis, to substantially eliminate the axial defocus 86 (shown in FIG. 9). The bend also accommodates tilting of the holding block 34 at an angle 90 with respect to the flexure base 32, which compensates for the lateral shift 88 (shown in FIG. 9), such that the focal point 26 coincides with the optical end point 48 of the fiber 42, thereby three-dimensionally aligning the first optical component 12 and the second optical component 40 for efficient optical coupling. In addition, the bend of the flexure creates a compressive force that is counteracted by the tension of the fine alignment screws, which allows for a tightly and securely held coupling. The coupling is finished and no curing, adhesives, or other post-processing is required.

FIGS. 11 and 12 are flow charts that describe two methods for precisely aligning optical components. FIG. 11 is a flow chart that shows the method steps such as described with reference to FIGS. 5 through 10 for example, in which the intentional misalignment is created by closing a gap between the base and flexure assemblies (see gap 68 in FIG. 6, for example). FIG. 12 is a flow chart that describes an alternative method of precise alignment, wherein the intentional misalignment is created by translation of the second optical component substantially along the z-axis, as will be described.

In FIG. 11, at 100, the base and flexure assemblies are positioned proximate to each other without consideration for alignment. At 102, a fixed gap is created between the base and flexure assemblies. At 104, the first and second optical components within the base and flexure assemblies are aligned in three dimensions. At 106, the base and flexure assemblies are fastened together, thereby misaligning the first and second optical components and causing a defocus. At 108, the first and second optical components are aligned by lengthening and tilting the flexure assembly, which causes the second optical component to translate along the longitudinal axis and tilt with respect to the longitudinal axis, such as described with reference to FIGS. 8 and 10.

FIG. 12 is a flow chart of an alternative precision alignment method in which the intentional defocus between the rough and fine alignment steps is created by offsetting the second optical component within the flexure assembly, as described below, to cause a misalignment that defocuses the optical components prior to fine alignment.

At 200, the base and flexure assemblies are positioned proximate to each other, such as shown in FIG. 5.

At 202, the base and flexure assemblies are brought approximately adjacent to each another, and possibly into sliding contact.

At 204, the first and second optical components are roughly aligned in three dimensions using a technique similar to that described with reference to FIG. 6, however without a fixed gap. That is, x- and y-axis alignment may be accomplished using an x-y positioner, such as a nanopositioner, and z-axis alignment is accomplished by sliding the second optical component within the flexure assembly, with the base and flexure assemblies approximately adjacent to each other.

At 206, the ferrule is offset along the channel of the flexure assembly by a fixed amount (e.g. 50 microns), by sliding the ferrule along the z-axis such as shown at 92 in FIG. 6, which causes an intentional misalignment that defocuses the first and second optical components. This misalignment will be compensated for during fine alignment. The amount of the fixed offset will depend on a variety of parameters, such as the flexure material, size of the coupling, and criticality of the coupling accuracy. Thus, although about 50 microns has been suggested for one example, a large range of offsets may be utilized. For example, an offset within a range of 10–500 microns may be suitable for some embodiments, while other embodiments may require offset ranges of 20–80 microns or 40–60 microns.

After offsetting the second optical component, the ferrule is locked in place by any suitable fastening system such as the locking screw 82 described with reference to FIG. 2, above. In some cases, clamping the ferrule will cause a slight shift in the x-y alignment of the first and second optical components. If necessary, the x-y positioner may again be used to correct any misalignment that occurred while locking the ferrule.

At 208, the base and flexure assemblies are fastened together using a fastening system such as described in the previous embodiments, such as described with reference to FIG. 7, with the exception that the base and flexure assemblies are already in substantial contact with each other in this implementation.

At 210, the fine alignment process is performed, such as described with reference to FIG. 8. For example, the fine alignment screws are progressively tightened to lengthen the flexure assembly and tilt the ferrule holding block, thereby translating and tilting the second optical component and producing fine three-dimensional alignment and efficient optical coupling.

Those skilled in the art will recognize that this flexure assembly and alignment technique may be applied to a variety of different laser systems and other applications, including non-optical applications requiring precision alignment. The choice of materials, geometries and fasteners may also be changed to optimize for specific conditions (e.g., greater fine alignment range or finer precision).

It will be further appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A method for alignment of a first component to a second component, wherein the first component is disposed within a base assembly and the second component is disposed within a flexure assembly that defines a longitudinal axis, the method comprising the steps of:

positioning said flexure assembly proximate to said base assembly;

roughly aligning said first component with said second component;

intentionally misaligning said first and second components substantially along said longitudinal axis; and finely aligning said first component to said second component in three dimensions including compensating for said intentional misalignment along said longitudinal axis.

2. The method of claim 1, wherein the step of intentionally misaligning said first and second components comprises:

introducing a fixed gap between said flexure assembly and said base assembly before roughly aligning said first component to said second component; and eliminating said fixed gap by fastening said base assembly to said flexure assembly after roughly aligning said first component to said second component.

3. The method of claim 2, wherein said fixed gap is within a range of about 10 to 500 microns.

4. The method of claim 3, wherein said fixed gap is about 50 microns.

5. The method of claim 1, wherein the step of intentionally misaligning said first and second components comprises:

positioning said base and flexure assemblies approximately adjacent to each other before roughly aligning said first component with said second component; and offsetting said second component within said flexure assembly by a fixed amount after roughly aligning said first component with said second component.

6. The method of claim 5, wherein said fixed amount is within a range of about 10 to 500 microns.

7. The method of claim 6, wherein said fixed amount is about 50 microns.

8. The method of claim 5, further comprising:

locking said second component in place after offsetting said second component within said flexure assembly; and re-aligning said first and second optical components in two dimensions after locking said second optical component in place.

9. The method of claim 1, wherein the step of finely aligning said first component to said second component comprises progressively increasing tension around the periphery of said flexure assembly to translate said second optical component along the longitudinal axis and tilt said second optical component with respect to said longitudinal axis.

10. The method of claim 9, wherein the step of progressively increasing tension around the periphery of said flexure assembly comprises progressively tightening a plurality of screws around the periphery of said flexure assembly.

11. The method of claim 1, wherein said first and second components are optical components.

12. The method of claim 11, wherein said first component comprises a light source and said second component comprises an optical fiber.

13. The method of claim 12, wherein said light source comprises a laser diode.

14. The method of claim 11, wherein said first component comprises an optical fiber and said second component comprises an optical fiber.

15. The method of claim 1, further comprising fastening said first and second components together prior to the step of finely aligning said first component to said second component, such that no adhesives are necessary after said step of finely aligning.

16. The method of claim 1, wherein the step of roughly aligning said first component to said second component includes aligning said first and second components in three dimensions including aligning said flexure assembly with respect to said base assembly laterally, such that said first component is laterally aligned with said second component, and aligning said second component along said longitudinal axis of said flexure assembly such that said first component is longitudinally aligned with respect to said second component.

17. A flexure assembly for aligning and optically coupling a first optical component in a base assembly to a second, small aperture component in said flexure assembly, said flexure assembly defining a longitudinal axis, said flexure assembly comprising:
a flexure base that has an outer surface configured to attach with the base assembly;
a channel configured to receive said second optical component therein and to position said small aperture for optical coupling with said first optical component;
a flexure attached to said flexure base and said channel, said flexure having a first, neutral configuration and a second, deformed configuration in which the small aperture is translated approximately longitudinally; and
a tensioning system on said flexure assembly, said tensioning system configured to increase tension on said flexure to deform said flexure so that said small aperture translates approximately along said longitudinal axis by an approximately fixed offset amount from a first position to a second position, said tensioning system also allowing said small aperture to tilt with respect to said longitudinal axis, thereby allowing precise alignment of said small aperture for efficient coupling with said optical component in said base assembly.

18. The flexure assembly of claim 17, further comprising:
a holding block that has an outer surface through which said channel opens to receive said second optical component with said small aperture;
an inner surface on said flexure base that faces said holding block; and wherein said tensioning system comprises a plurality of alignment holes formed through said holding block and a plurality of alignment screws configured to extend through said alignment holes and abut said inner surface of said flexure base, such that progressively tightening said screws against said inner surface of said flexure base causes increased tension within said flexure assembly.

19. The flexure assembly of claim 18, wherein said alignment holes comprise a plurality of holes around said holding block and said alignment screws comprise a plurality of screws disposed within said alignment holes.

20. The flexure assembly of claim 17, further comprising a fastening system configured to attach said outer surface of said flexure base to the base assembly.

21. The flexure assembly of claim 20, wherein said fastening system comprises:
a plurality of through-holes around the periphery of said flexure base that extend through said flexure base; and
a plurality of fastening screws configured to extend through said through-holes and attach to a plurality of screw holes on the base assembly, said through-holes and said fastening screws having a configuration allowing said flexure assembly to be aligned and affixed with said base assembly in rough alignment.

22. The flexure assembly of claim 17, wherein said second component comprises an optical fiber held within a ferrule.

23. The flexure assembly of claim 17, wherein said channel is disposed at an angle with respect to said longitudinal axis of said flexure assembly.

24. A method for coupling a first optical component to a second optical component, wherein the first optical component is disposed within a base assembly and the second optical component is disposed within a flexure assembly having a flexure therein, the first optical component is positioned along an optical axis and configured to focus light at a focal point along the optical axis, the second optical component is positioned along a longitudinal axis of the flexure assembly and has an optical end point, the method comprising the steps of:
positioning said flexure assembly proximate to said base assembly;
roughly aligning said first optical component with respect to said second optical component such that said focal point of said first optical component is positioned to approximately coincide with said optical end point of said second optical component for efficient light coupling;
intentionally misaligning and thereby defocusing said optical end point with respect to said focal point substantially along said longitudinal axis;
fastening said flexure assembly to said base assembly; and
finely aligning said first optical component with said second optical component, including progressively increasing tension around the periphery of said flexure assembly thereby causing said second optical component to translate along said longitudinal axis and tilt about said longitudinal axis such that said first and second optical components are three-dimensionally aligned for efficient light coupling.

25. The method of claim 24, wherein the misaligning step comprises:
introducing a fixed gap between said flexure assembly and said base assembly before roughly aligning said first and second optical components; and
eliminating said fixed gap by fastening said base assembly to said flexure assembly after roughly aligning said first optical component to said second optical component.

26. The method of claim 25, wherein said fixed gap is within a range of about 10 to 500 microns.

27. The method of claim 26, wherein said fixed gap is about 50 microns.

28. The method of claim 24, wherein the step of intentionally defocusing said optical end point with respect to said focal point comprises:
positioning said base and flexure assemblies approximately adjacent to each other before roughly aligning said first component with said second component; and
offsetting said second optical component within said flexure assembly by a fixed amount after roughly aligning said first component with said second component.

29. The method of claim 28, wherein said fixed amount is within a range of about 10 to 500 microns.

30. The method of claim 28, wherein said fixed amount is about 50 microns.

31. The method of claim 28, further comprising:
locking said second optical component in place by a locking screw after offsetting said second optical component within said flexure assembly; and
re-aligning said first and second optical components in two dimensions after locking said second optical component in place.

32. The method of claim 24, wherein progressively increasing tension around the periphery of said flexure assembly comprises tightening a plurality of screws disposed around the periphery of said flexure assembly.

33. The method of claim 24, wherein the step of fastening said flexure assembly to said base assembly comprises fastening a plurality of screw fasteners from said flexure assembly into said base assembly.

34. The method of claim 24, wherein the step of roughly aligning said first optical component with said second optical component comprises:
aligning said flexure assembly with respect to said base assembly laterally along two axes perpendicular to said longitudinal axis of said flexure assembly, such that said focal point of said first optical component is positioned to approximately coincide with said optical end point of said second optical component; and
aligning said second optical component within said flexure assembly along said longitudinal axis such that said optical end point is positioned to approximately coincide with said focal point of said first optical component.

35. The method of claim 34, wherein the step of aligning said flexure assembly with respect to said base assembly laterally along two axes perpendicular to said longitudinal axis is accomplished using an x-y positioner.

36. The method of claim 24, wherein said first optical component comprises a light source and said second optical component comprises an optical fiber.

37. The method of claim 36, wherein said light source comprises a diode laser.

38. The method of claim 24, wherein said first optical component comprises an optical fiber and said second optical component comprises an optical fiber.

39. The method of claim 24, wherein said efficient light coupling is determined by measuring power output of said second optical component to determine a desired light output.

40. A flexure assembly for aligning and coupling a first optical component in a base assembly to an optical fiber that has an optical aperture, said optical fiber arranged in said flexure assembly, to define a longitudinal axis, comprising:
flexure means for allowing said flexure assembly to deform in response to tension from a neutral configuration to a deformed configuration;
rough alignment means for aligning the optical aperture in the optical fiber in said neutral configuration;
offsetting means for offsetting said roughly aligned optical fiber by a fixed amount; and
fine alignment means, including tensioning means for tensioning said flexure assembly and deforming said flexure to said deformed configuration, and thereby translating said optical fiber so that said optical aperture translate along said longitudinal axis by approximately said fixed amount of offset, and tilting said optical fiber about said longitudinal axis.

41. The flexure assembly of claim 40, further comprising a channel within said flexure assembly configured to receive said optical fiber and to allow movement of said optical fiber therein, thereby allowing rough alignment.

42. The flexure assembly of claim 40, wherein said flexure means comprises a metal diaphragm flexure within said flexure assembly that deforms in response to tensioning said flexure assembly.

43. The flexure assembly of claim 40, wherein said tensioning means comprises a plurality of screws within said flexure assembly, configured to translate said optical fiber along said longitudinal axis and tilt said optical fiber about said longitudinal axis, by tightening said plurality of screws.

44. The flexure assembly of claim 40, further comprising fastening means for fastening said flexure assembly to the base assembly.

45. A method for alignment of a first component to a second component, wherein the first component is disposed within a base assembly and the second component is disposed within a flexure assembly that comprises a flexure and that defines a longitudinal axis, the method comprising the steps of:
positioning said flexure assembly proximate to said base assembly;
roughly aligning said first component with said second component in three dimensions;
providing compressive forces within said flexure;
finely aligning said first component to said second component in three dimensions including providing tension to work against said compression within said flexure assembly;
wherein the step of providing compression within said flexure assembly is provided by:
intentionally misaligning said first and second components substantially along said longitudinal axis after said rough alignment step and before said fine alignment step; and
bending said flexure during said fine alignment step to compensate for said intentional misalignment.

46. The flexure assembly of claim 17 wherein said small aperture component comprises a single mode optical fiber.

47. The flexure assembly of claim 17 wherein said flexure comprises a continuous metal material, and said metal is deformed in said deformed configuration.

48. The flexure assembly of claim 17 wherein said flexure is deformed into an approximately conical shape in said deformed configuration.

49. The flexure assembly of claim 17 wherein said fixed offset amount between said neutral position of the small aperture and said deformed position is within a range of about 10–500 microns.

50. The flexure assembly of claim 17 wherein said fixed offset amount between said neutral position of the small aperture and said deformed position is within a range of 20–80 microns.

51. The flexure assembly of claim 17 wherein said base assembly and said flexure assembly define a sealed chamber isolated from said tensioning and an outside environment, thereby protecting said small aperture and the aperture of said optical component against possible contamination from said tensioning system and the outside environment.

52. The flexure assembly of claim 40 wherein said optical fiber is a single mode optical fiber.

53. The flexure assembly of claim 40 wherein said flexure comprises a continuous metal material, and said metal flexure is deformed into an approximately conical shape in said deformed configuration.

54. The flexure assembly of claim 40 wherein said fixed offset amount between said neutral configuration of the aperture and said deformed configuration is within range of about 20–80 microns.

55. The flexure assembly of claim 40 wherein said base assembly and said flexure assembly define a sealed chamber isolated from said tensioning means and an outside environment, thereby protecting said aperture and the aperture of said optical component against possible contamination from said tensioning means and the outside environment.

* * * * *